United States Patent
Gokan et al.

(10) Patent No.: US 10,011,251 B2
(45) Date of Patent: Jul. 3, 2018

(54) CLEANING DEVICE FOR VEHICLE-MOUNTED CAMERA

(71) Applicant: NISSAN MOTOR CO., LTD., Yokohama-shi, Kanagawa (JP)

(72) Inventors: Toshimichi Gokan, Machida (JP); Yonosuke Nishioku, Atsugi (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 0 days.

(21) Appl. No.: 14/413,904

(22) PCT Filed: Jul. 9, 2013

(86) PCT No.: PCT/JP2013/068717
§ 371 (c)(1),
(2) Date: Jan. 9, 2015

(87) PCT Pub. No.: WO2014/010580
PCT Pub. Date: Jan. 16, 2014

(65) Prior Publication Data
US 2015/0151722 A1 Jun. 4, 2015

(30) Foreign Application Priority Data
Jul. 11, 2012 (JP) ................................ 2012-155360

(51) Int. Cl.
*B60S 1/50* (2006.01)
*B60S 1/56* (2006.01)
(Continued)

(52) U.S. Cl.
CPC ............... *B60S 1/56* (2013.01); *B05B 1/267* (2013.01); *B05B 7/0416* (2013.01);
(Continued)

(58) Field of Classification Search
CPC ...... B05B 1/267; B05B 7/0416; B05B 7/0876; B05B 7/0892; B05B 12/02; B60S 1/52;
(Continued)

(56) References Cited

U.S. PATENT DOCUMENTS 5,068,770 A * 11/1991 Baziuk ................. B60Q 1/0005
15/250.01
5,853,025 A * 12/1998 Daneshvar .............. B60S 1/481
137/565.34
(Continued)

FOREIGN PATENT DOCUMENTS

JP 2001-171491 A 6/2001
JP 2003-203884 A 7/2003
(Continued)

*Primary Examiner* — Alexander Markoff
(74) *Attorney, Agent, or Firm* — Young Basile Hanlon & MacFarlane, P.C.

(57) ABSTRACT

An air passage and two lines of cleaning liquid paths are provided in a nozzle, and the air passage is bifurcated into two lines of distal end portions. A secondary tank is provided upstream of the cleaning liquid paths. A distal end portion of a cleaning liquid path and the distal end portion of the air passage are merged. When a compressed air is supplied to the air passage, the resulting air flow makes the inside of the secondary tank to be negative pressure. Thus, the cleaning liquid can be made into the form of a mist, and is suctioned, and the cleaning liquid in the form of a mist and the compressed air are mixed, whereby it is possible to clean a lens surface and to reduce the amount of cleaning liquid used.

2 Claims, 8 Drawing Sheets

(51) Int. Cl.
*B05B 1/26* (2006.01)
*B05B 7/04* (2006.01)
*B05B 7/08* (2006.01)
*B60S 1/08* (2006.01)
*H04N 5/217* (2011.01)
*H04N 5/225* (2006.01)
*B60S 1/52* (2006.01)
*B60R 11/04* (2006.01)
*G03B 17/02* (2006.01)
*B05B 12/02* (2006.01)

(52) U.S. Cl.
CPC .......... *B05B 7/0876* (2013.01); *B05B 7/0892* (2013.01); *B60R 11/04* (2013.01); *B60S 1/0848* (2013.01); *B60S 1/50* (2013.01); *B60S 1/52* (2013.01); *G03B 17/02* (2013.01); *H04N 5/2171* (2013.01); *H04N 5/2251* (2013.01); *H04N 5/2252* (2013.01); *B05B 12/02* (2013.01)

(58) Field of Classification Search
CPC ........ B60S 1/0844; B60S 1/0848; B60S 1/56; B60R 11/04; G03B 17/02; H04N 5/2171; H04N 5/2251; H04N 5/2252
See application file for complete search history.

(56) References Cited

U.S. PATENT DOCUMENTS

| | | | | |
|---|---|---|---|---|
| 6,237,627 | B1* | 5/2001 | Boule | B60S 1/481 137/571 |
| 2001/0054655 | A1* | 12/2001 | Berg | B60S 1/481 239/284.1 |
| 2002/0005440 | A1* | 1/2002 | Holt | B05B 7/08 239/284.2 |
| 2009/0250533 | A1* | 10/2009 | Akiyama | B60S 1/58 239/284.1 |
| 2011/0073142 | A1 | 3/2011 | Hattori et al. | |
| 2012/0117745 | A1 | 5/2012 | Hattori et al. | |

FOREIGN PATENT DOCUMENTS

| | | | |
|---|---|---|---|
| JP | 2004-182080 A | | 7/2004 |
| JP | 2006-160103 A | | 6/2006 |
| JP | 2006160103 A | * | 6/2006 |
| JP | 2007-318355 A | | 12/2007 |
| JP | 2011-240920 A | | 12/2011 |

* cited by examiner (a)

(b)

(a)

(b)

CLEANING DEVICE FOR VEHICLE-MOUNTED CAMERA

CROSS REFERENCE TO RELATED APPLICATION

The present application claims priority to Japanese Patent Application No. 2012-155360, filed Jul. 11, 2012, incorporated herein in its entirety.

TECHNICAL FIELD

The present invention relates to a cleaning device for cleaning a vehicle-mounted camera mounted, for example, at the rear portion of a vehicle to capture images of the rear of the vehicle.

BACKGROUND

For a vehicle-mounted camera, which is, for example, mounted at the rear of a vehicle and captures surrounding images to monitor a vehicle traveling behind the vehicle or obstructions existing in the surroundings of the vehicle, foreign substances such as water droplets and mud may be attached on a lens serving as an image-capturing surface, for example, during rainy weather. In such a case, the vehicle-mounted camera cannot clearly capture the surrounding image. In this respect, there is a known device for cleaning a lens of the vehicle-mounted camera described, for example, in Japanese Patent Laid-Open Publication No. 2001-171491. With the cleaning device disclosed in Japanese Patent Laid-Open Publication No. 2001-171491, a cleaning liquid is sprayed over the lens surface of the camera, and then, high-pressurized air is sprayed to remove the foreign substances attached on the lens.

However, the conventional example disclosed in Japanese Patent Laid-Open Publication No. 2001-171491 described above needs a large amount of cleaning liquid to be sprayed over the lens surface, causing a problem of consuming the large amount of cleaning liquid.

SUMMARY

The present invention has been made to solve the problem of the conventional technique as described above, and an object of the present invention is to provide a cleaning device for a vehicle-mounted camera, which can reliably clean the lens surface with a small amount of cleaning liquid.

In order to achieve the object described above, a cleaning device for a vehicle-mounted camera according to the present application includes: a nozzle having a discharge port from which a cleaning liquid and a compressed air discharge and which are disposed so as to face a lens surface of a camera, and having a cleaning liquid path that guides the cleaning liquid to the discharge port and an air passage that guides the compressed air to the discharge port; a primary tank that stores the cleaning liquid; a secondary tank configured to have a volume for storing the cleaning liquid smaller than the primary tank, be disposed close to the nozzle so as to be able to temporarily store the cleaning liquid supplied from the primary tank, and be connected with the cleaning liquid path; a cleaning-liquid delivery section that delivers the cleaning liquid stored in the primary tank to the secondary tank through a cleaning liquid pipe connected with the secondary tank; and a compressed-air delivery section that delivers the compressed air to the nozzle through an air pipe connected with the air passage.

BRIEF DESCRIPTION OF DRAWINGS

FIGS. 2(a) and 2(b) are perspective views each illustrating a configuration of the cleaning device for a vehicle-mounted camera according to the embodiment of the present invention, in which FIG. 2(a) is a perspective view illustrating the cleaning device according to this embodiment in a state where the device is installed to a camera mounted at the rear portion of a vehicle, and FIG. 2(b) is a diagram illustrating the cleaning device illustrated in FIG. 2(a) when viewed from a direction "A."

FIGS. 4(a) and 4(b) are sectional views each illustrating a distal end portion of a nozzle of the cleaning device for a vehicle-mounted camera according to the embodiment of the present invention, in which FIG. 4(a) is an exploded view illustrating the distal end portion of the nozzle, and FIG. 4(b) is a sectional view illustrating a portion of a reference sign P1 in FIG. 4(a).

FIGS. 6(a) and 6(b) are diagrams each illustrating a configuration of the cleaning device for a vehicle-mounted camera according to the embodiment of the present invention, in which FIG. 6(a) is a perspective view illustrating the cleaning device according to this embodiment in a state where the device is installed to a camera mounted at the rear portion of a vehicle, and FIG. 6(b) is a sectional view illustrating a nozzle unit taken along a line D-D illustrated in FIG. 6(a).

FIGS. 7(a) and 7(b) are timing charts each showing processes in a pressurized cleaning mode performed by the cleaning device for a vehicle-mounted camera according to the embodiment of the present invention, in which FIG. 7(a) is a timing chart showing an operation of a cleaning liquid pump, and FIG. 7(b) is a timing chart showing an operation of an air pump.

FIGS. 8(a) and 8(b) are timing charts each showing processes in an air blow mode performed by the cleaning device for a vehicle-mounted camera according to the embodiment of the present invention, in which FIG. 8(a) is a timing chart showing an operation of the cleaning liquid pump, and FIG. 8(b) is a timing chart showing an operation of the air pump.

FIGS. 9(a) and 9(b) are timing charts each showing processes in a continuous water supply mode performed by the cleaning device for a vehicle-mounted camera according to the embodiment of the present invention, in which FIG. 9(a) is a timing chart showing an operation of the cleaning liquid pump, and FIG. 9(b) is a timing chart showing an operation of the air pump.

DESCRIPTION OF EMBODIMENTS

Herein below, an embodiment according to the present invention will be described with reference to the drawings.

Figure 1:
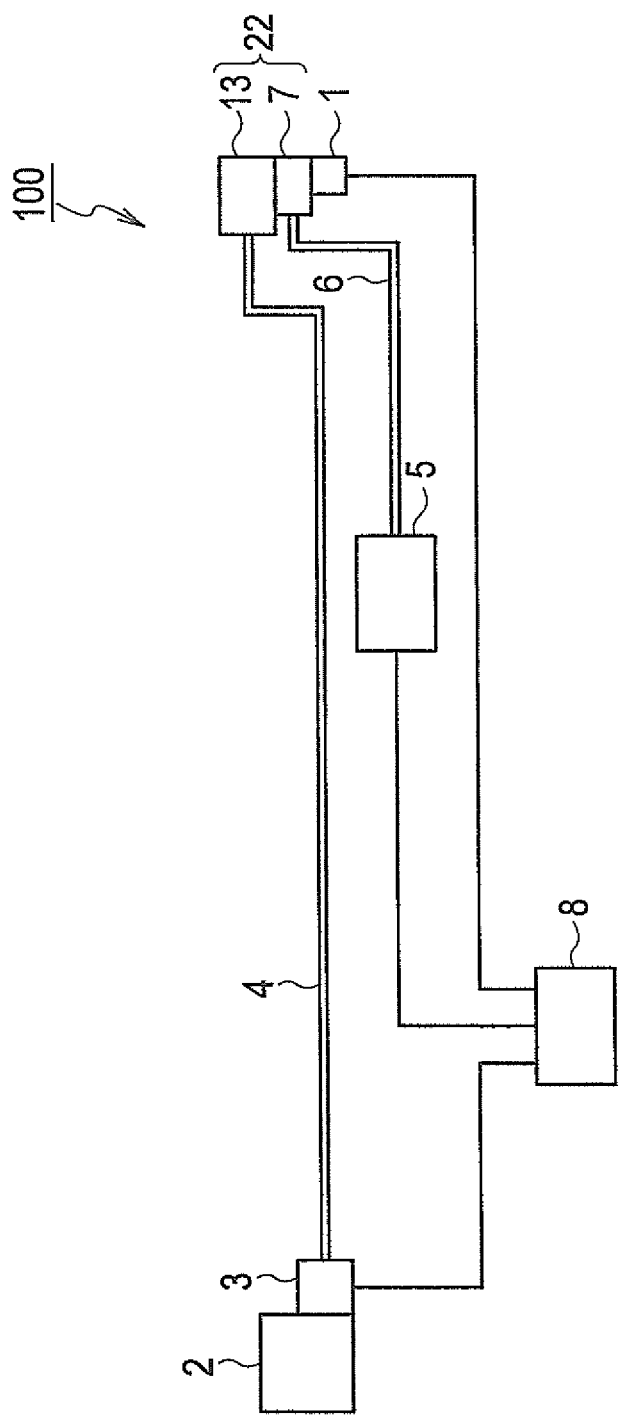
FIG. 1 is a block diagram illustrating a configuration of a cleaning device for a vehicle-mounted camera according to an embodiment of the present invention.

FIG. 1 is a block diagram illustrating a configuration of a cleaning device for a vehicle-mounted camera according to an embodiment of the present invention. As illustrated in FIG. 1, a cleaning device 100 according to this embodiment includes a cleaning liquid reservoir tank 2 (primary tank) that stores a cleaning liquid, a cleaning liquid pump 3 (cleaning-liquid delivery section) that delivers the cleaning liquid stored in the cleaning liquid reservoir tank 2, an air pump 5 (compressed-air delivery section) that delivers a compressed air, and a nozzle 7 for discharging the cleaning liquid, the compressed air, or a mixture of the cleaning liquid and the compressed air to a lens surface of a camera 1.

Furthermore, there are provided a cleaning liquid pipe 4 that guides the cleaning liquid delivered by the cleaning liquid pump 3 to a secondary tank 13 that stores the cleaning liquid, an air pipe 6 that guides the compressed air delivered by the air pump 5 to the nozzle 7 of a nozzle unit 22, and a controller 8 (control section) that controls operations of the cleaning liquid pump 3 and the air pump 5.

Figure 2:
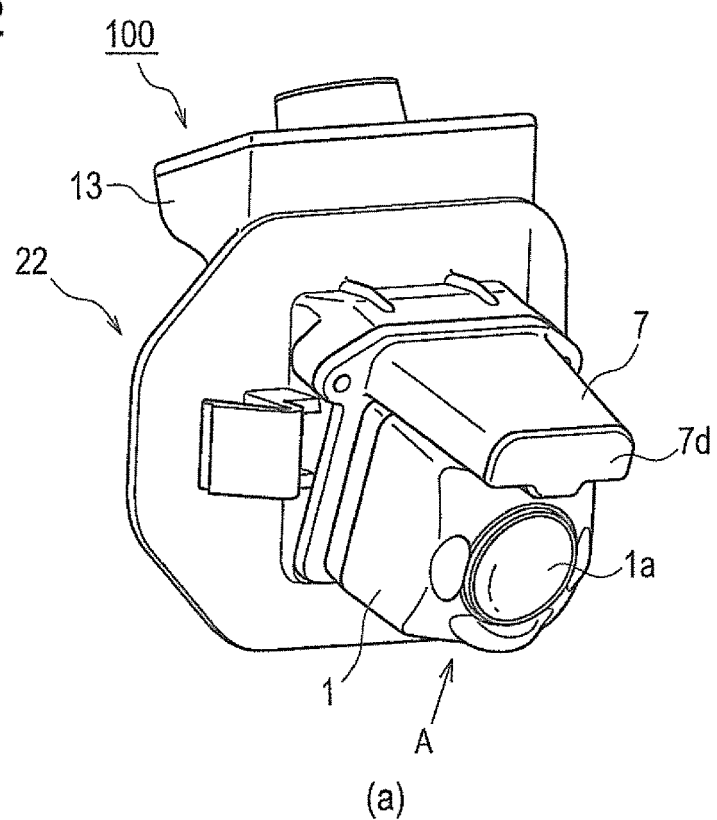
Figure 2:
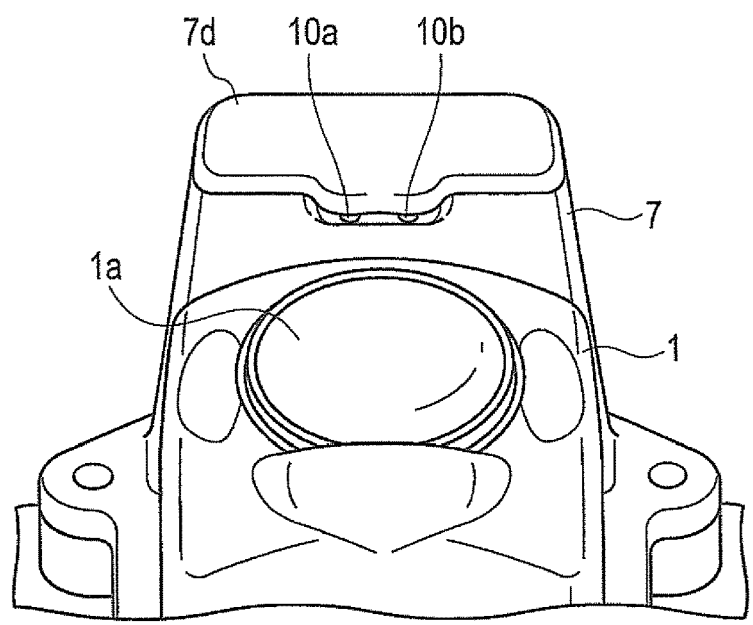

FIG. 2(a) is a perspective view illustrating the cleaning device 100 according to this embodiment in a state where the device is installed to a camera 1 mounted at the rear portion of a vehicle, and FIG. 2(b) is a diagram illustrating the cleaning device 100 illustrated in FIG. 2(a) when viewed from the direction "A." As illustrated in FIG. 2(a), the nozzle unit 22 that is fixed at the rear portion of the vehicle and cleans a lens surface 1a is provided in the vicinity of a side portion of the camera 1 fixed at the rear portion of the vehicle. The nozzle unit 22 includes the nozzle 7 from which a cleaning liquid and compressed air discharge toward the lens surface 1a, and a cap 7d. As illustrated in FIG. 2(b), the nozzle 7 has a distal end portion provided with two discharge ports 10a and 10b from which the cleaning liquid and the compressed air discharge. In other words, configuration is made such that, by discharging the cleaning liquid and the compressed air from the discharge ports 10a and 10b of the nozzle 7 toward the lens surface 1a, foreign substances attached on the lens surface 1a are removed.

Figure 3:
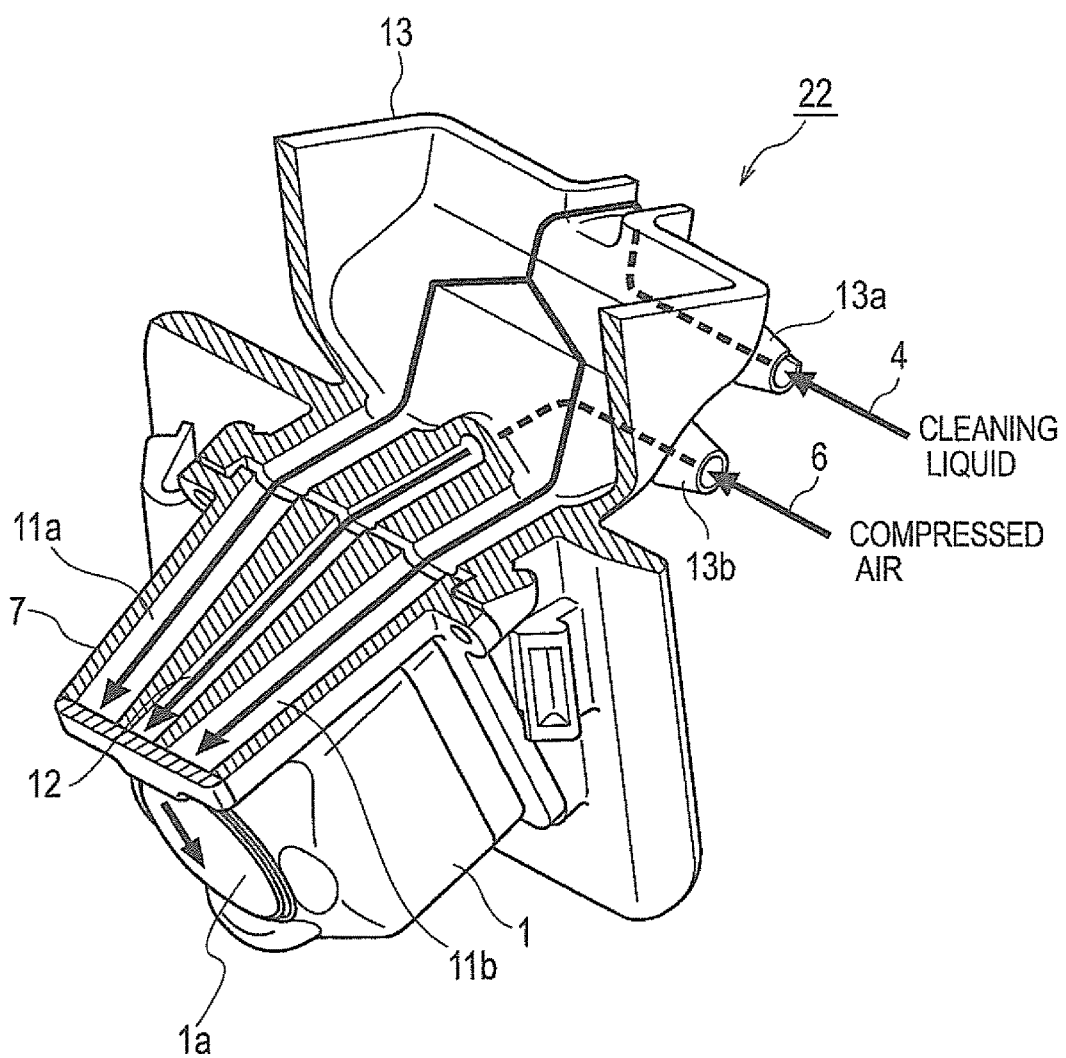
FIG. 3 is a partially-sectioned perspective view illustrating a nozzle unit provided to the cleaning device for a vehicle-mounted camera according to the embodiment of the present invention.

FIG. 3 is a partially-sectioned perspective view illustrating the nozzle unit 22 illustrated in FIG. 2(a). As illustrated in FIG. 3, the nozzle 7, provided on the distal end side of the nozzle unit 22, has the central portion provided with an air passage 12 that guides the compressed air, and at both ends in the left and right sides of this air passage 12, cleaning liquid paths 11a and 11b that guide the cleaning liquid are provided. Furthermore, the distal end of each of the air passage 12 and the cleaning liquid paths 11a and 11b is bent at a substantially right angle so as to face the lens surface 1a of the camera 1.

Furthermore, a secondary tank 13 that temporarily stores the cleaning liquid is provided upstream of the cleaning liquid paths 11a and 11b. On the side portion of this secondary tank 13, a plug 13a for connecting the cleaning liquid pipe 4 and a plug 13b for connecting the air pipe 6 are provided. Of these plugs, the plug 13b is connected with the air passage 12 through a flow path provided below the secondary tank 13. In other words, the compressed air guided through the plug 13b into the nozzle unit 22 is led directly into the air passage 12.

Furthermore, the plug 13a is connected with the secondary tank 13, and the cleaning liquid supplied through this plug 13a is led into the secondary tank 13 from above. In this case, the pipe extending from the plug 13a and connected with the secondary tank 13 is disposed in the vertical direction as indicated by the reference sign 23 in FIG. 6(b). Details of this pipe 23 will be described later.

In addition, as illustrated in FIG. 3, the bottom portion of the secondary tank 13 is connected with two lines of the cleaning liquid paths 11a and 11b, and is disposed at a position higher than the discharge ports 10a and 10b. Thus, the compressed air delivered by the air pump 5 illustrated in FIG. 1 is led into the air passage 12 of the nozzle 7 through the air pipe 6, whereas the cleaning liquid delivered by the cleaning liquid pump 3 is stored in the secondary tank 13, and then, is led into the two lines of the cleaning liquid paths 11a and 11b. Furthermore, the secondary tank 13 has the volume smaller than the cleaning liquid reservoir tank 2 illustrated in FIG. 1.

Figure 4A:
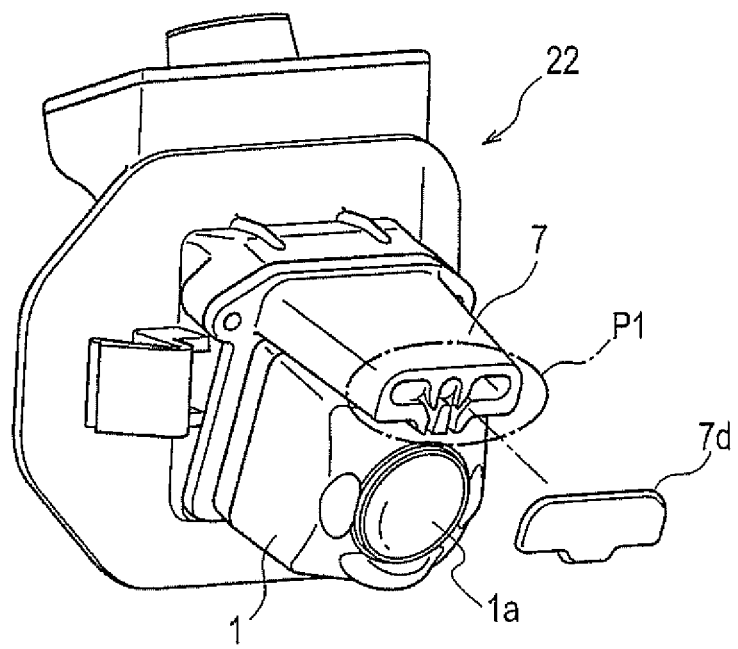
Figure 4B:
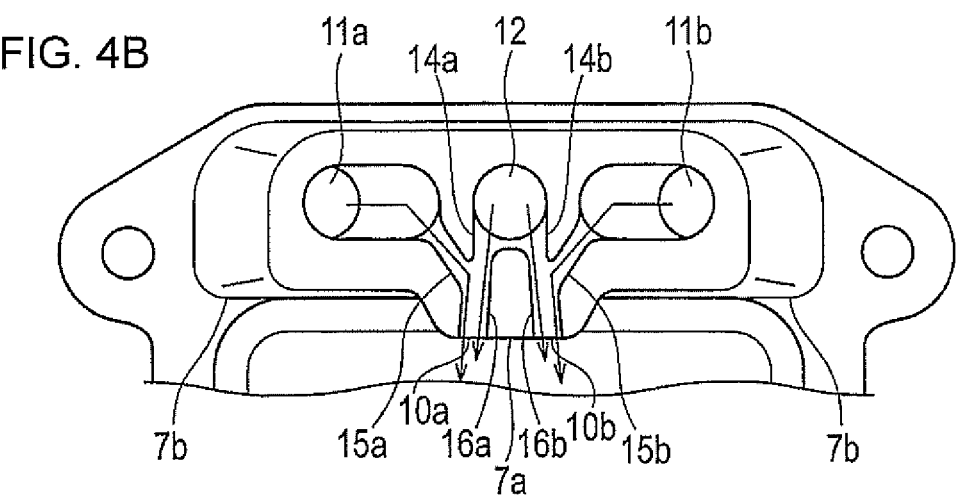

FIG. 4(b) is an explanatory view illustrating a detailed configuration of the distal end portion of the nozzle, and is a sectional view illustrating a portion of the reference sign P1 in FIG. 4(a). As illustrated in FIG. 4(b), at the distal end portion of the nozzle 7, the air passage 12 is provided at the center, and the two cleaning liquid paths 11a and 11b are provided so as to be located at both sides of the air passage 12. In other words, the cleaning liquid paths according to this embodiment are formed by two lines of the cleaning liquid paths 11a and 11b provided so as to be located at both sides of this air passage 12.

The cleaning liquid paths 11a and 11b are connected to distal end portions 15a and 15b, respectively. In this case, the area of a flow path of each of the distal end portions 15a and 15b is smaller than the area of a flow path of each of the cleaning liquid paths 11a and 11b. Thus, the speed of the cleaning liquid flowing through each of the cleaning liquid paths 11a and 11b increases when it flows through each of the distal end portions 15a and 15b.

On the other hand, the distal end of the air passage 12 is bifurcated into two distal end portions 14a (first distal end portion) and 14b (second distal end portion). In this case, the area of a flow path of each of the distal end portions 14a and 14b is smaller than the area of a flow path of the air passage 12. Thus, the speed of the compressed air flowing through the air passage 12 increases when it flows through each of the distal end portions 14a and 14b.

Furthermore, the distal end portion 15a of the cleaning liquid path 11a, which is one side, merges with one distal end portion 14a of the air passage 12 to form a merging flow path 16a (first merging flow path), the distal end of which forms the discharge port 10a (see FIG. 2(b)). Furthermore, the distal end portion 15b of the cleaning liquid path 11b, which is the other side, merges with the other distal end portion 14b of the air passage 12 to form a merging flow path 16b (second merging flow path), the distal end of which forms the discharge port 10b (see FIG. 2(b)). In this case, the merging flow path 16a and the merging flow path 16b are disposed in a manner such that the distance between the two paths increases toward the distal end side thereof.

Figure 5:
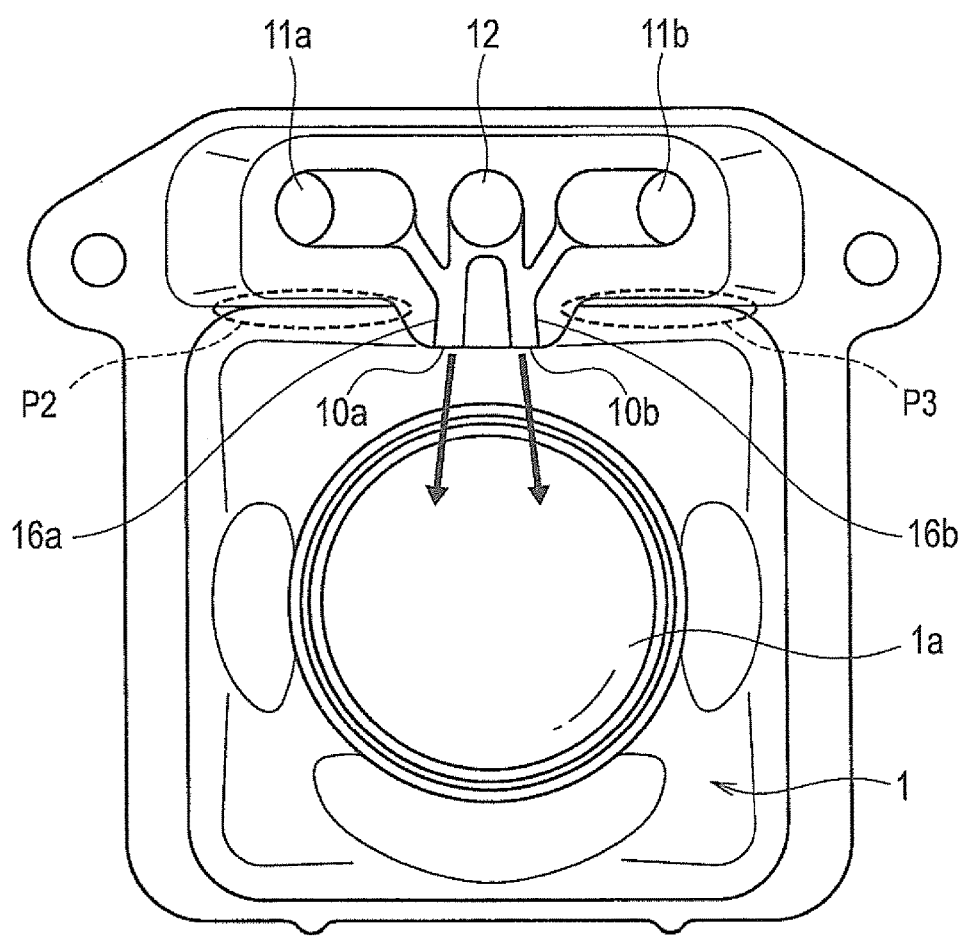
FIG. 5 is an explanatory view illustrating an arrangement relationship between the camera and the distal end portion of the nozzle provided to the cleaning device for a vehicle-mounted camera according to the embodiment of the present invention.

With this configuration, once the cleaning liquid delivered by the cleaning liquid pump 3 illustrated in FIG. 1 is stored in the secondary tank 13, and the compressed air is delivered by the air pump 5, the compressed air jets at an increased speed, and with the jet of the compressed air, the secondary tank 13 and the cleaning liquid paths 11a and 11b are made into a negative pressure to suction the cleaning liquid stored in the secondary tank 13. Thus, the compressed air and the cleaning liquid pass through the two merging flow paths 16a and 16b, jet from the discharge ports 10a and 10b, and are sprayed onto the lens surface 1a. At this time, the liquid, which is a mixture of the cleaning liquid and the compressed air, jets in a direction spreading out as illustrated in FIG. 5, whereby it is possible to clean the entire lens surface 1a.

Furthermore, as illustrated in FIG. 4(b), a jetting surface 7a, which is a distal end portion of the nozzle 7, is configured to protrude more forward than a side surface 7b (nozzle distal-end surface) in the vicinity of the jetting surface 7a. This configuration makes it possible to prevent the cleaning liquid jetting from the discharge ports 10a and 10b from being attached on the side surface 7b of the nozzle 7. More specifically, it is possible to prevent the cleaning liquid from being attached on areas indicated by the reference signs P2 and P3 in FIG. 5.

Figure 6:
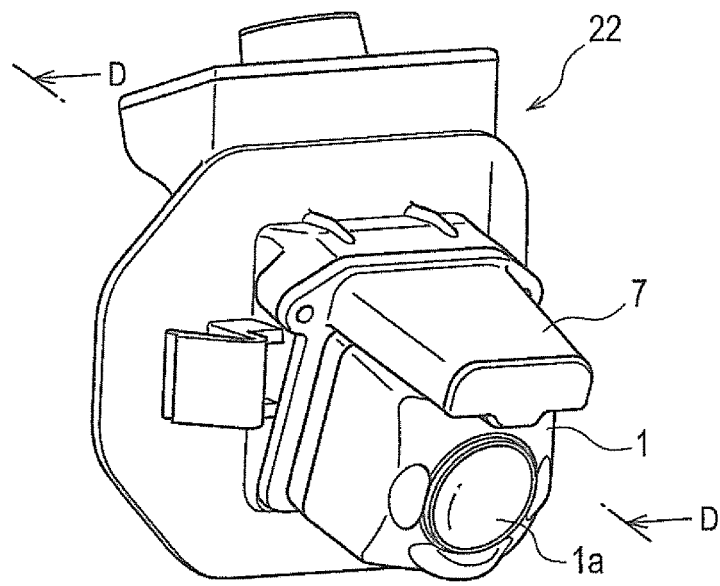
Figure 6:
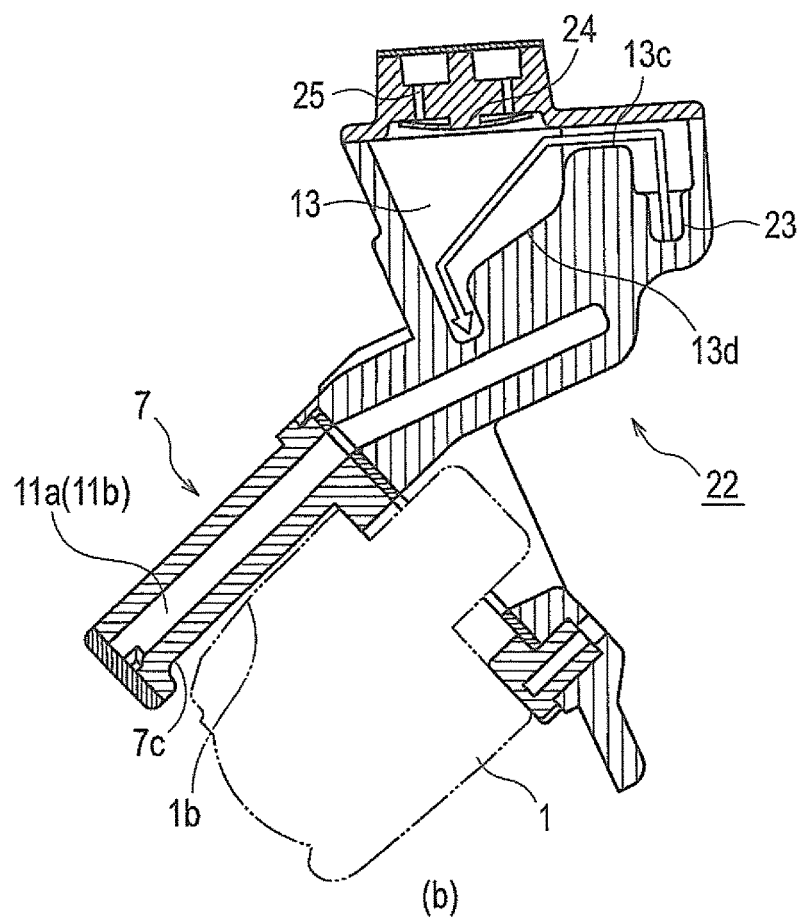

FIG. 6(b) is a sectional view illustrating the nozzle unit 22 illustrated in FIG. 6(a) and taken along the line D-D. As illustrated in FIG. 6(b), a small space is provided between a bottom surface 7c of the nozzle 7 and an upper surface 1b of the body of the camera 1. Furthermore, the width of this space is configured so as to be gradually narrower toward the inside of the space. With such a configuration, even if the cleaning liquid enters the space between the bottom surface 7c of the nozzle 7 and the upper surface 1b of the body of the camera 1, this cleaning liquid is gradually pushed toward the inside of the space portion between the nozzle 7 and the camera 1 due to the surface tension, and is released externally from the left and right sides of the camera 1 when viewed from the front. In other words, with the existence of the small space between the bottom surface 7c of the nozzle 7 and the upper surface 1b of the body of the camera 1, it is possible to avoid a problem such as a cleaning liquid staying to be solidified.

Furthermore, as illustrated in FIG. 6(b), a supply port 13c for supplying the cleaning liquid into the secondary tank 13 is provided on the upper part of the secondary tank 13 provided upstream of the nozzle 7, and to this supply port 13c, the pipe 23 placed in the vertical direction is provided. Then, this pipe 23 is connected with the plug 13a illustrated in FIG. 3. With the pipe 23 being placed in the vertical direction, it is possible to prevent the cleaning liquid staying in the pathway from irregularly entering the secondary tank 13 in the case where supply of the cleaning liquid by the cleaning liquid pump 3 (see FIG. 1) is stopped. In other words, it is possible to prevent the cleaning liquid from entering the secondary tank 13 due to vibration in a state where the secondary tank 13 is empty.

Furthermore, a check valve 24 is provided on the upper surface of the secondary tank 13. The check valve 24 is, for example, an umbrella valve, and is configured such that, if the pressure within the secondary tank 13 becomes negative pressure, the valve is opened to introduce the outside air through an air vent 25, and if the pressure within the secondary tank 13 becomes positive pressure, the valve is closed to prevent release to the outside. Thus, if the secondary tank 13 becomes negative pressure, the outside air enters the secondary tank 13, whereby it is possible to prevent the cleaning liquid from entering through the cleaning liquid pipe 4. In other words, the secondary tank 13 has the check valve that prevents air from leaking from the secondary tank 13 to the outside, and allows air to enter the secondary tank 13 from the outside.

Furthermore, as illustrated in FIG. 6(b), the bottom surface 13d of the secondary tank 13 is sloped so as to descend toward the front side (left side in the drawing). In addition, an outlet pipe of the secondary tank 13 as well as the cleaning liquid paths 11a and 11b and the air passage 12 (see FIG. 3) provided to the nozzle 7 are similarly configured to be sloped so as to descend toward the front side. With these configurations, the cleaning liquid stored in the secondary tank 13 does not stay in a certain location, and the slope on each of the portions causes the cleaning liquid to reliably flow toward the downstream side.

Next, operations of the cleaning device 100 according to this embodiment having the configuration as described above will be described. In this embodiment, there are three modes including a pressurized cleaning mode in which the cleaning liquid and the compressed air are caused to jet to clean the lens surface 1a, an air blow mode in which only the compressed air is delivered to remove water droplets attached on the lens surface 1a, and a continuous water supply mode in which the cleaning liquid is intermittently dropped on the lens surface 1a to make it difficult for dirt to be attached on the lens surface 1a.

Figure 7:
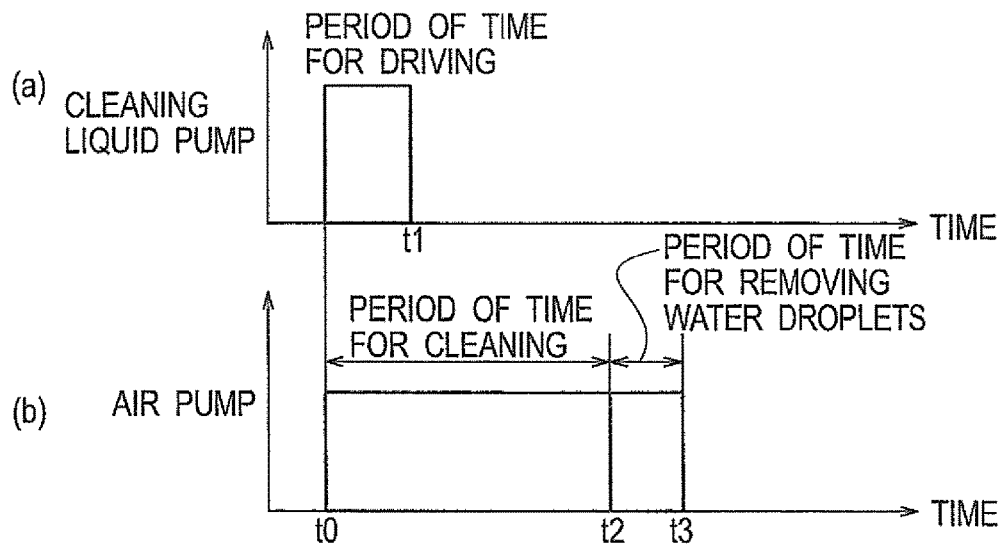

First, the pressurized cleaning mode will be described. In the pressurized cleaning mode, by driving the cleaning liquid pump 3 for a short period of time to store the cleaning liquid in the secondary tank 13, and at the same time, the air pump 5 is driven. More specifically, as illustrated in FIG. 7(a) and FIG. 7(b), both of the cleaning liquid pump 3 and the air pump 5 are driven at a time t0.

Then, during a period of time from t0 to t1 (for example, 200 msec), the cleaning liquid stored in the cleaning liquid reservoir tank 2 (primary tank) is supplied through the cleaning liquid pipe 4 to the secondary tank 13, and the cleaning liquid is stored in this secondary tank 13. Note that the period of time from t0 to t1 is set to be a period of time required for fully filling the secondary tank 13 with the cleaning liquid by the cleaning liquid pump 3.

Furthermore, the compressed air delivered from the air pump 5 passes through the air pipe 6, and is introduced into the air passage 12 within the nozzle 7 illustrated in FIG. 3. Then, the compressed air is delivered from the distal end portions 14a and 14b illustrated in FIG. 4(b) to the merging flow paths 16a and 16b. At this time, since the area of the flow path of each of the distal end portions 14a and 14b is set to be smaller than that of the air passage 12, the speed of the air flow increases in each of the distal end portions 14a and 14b. This makes the distal end portions 15a and 15b of the cleaning liquid paths 11a and 11b located upstream of the merging flow paths 16a and 16b, to be negative pressure to suction the cleaning liquid stored in the secondary tank 13, and the cleaning liquid suctioned passes through the cleaning liquid paths 11a and 11b, and enters the merging flow paths 16a and 16b. In other words, by using the reduction in pressure in the secondary tank 13 due to the air flow of the compressed air, the cleaning liquid from the secondary tank 13 is suctioned to pass through the cleaning liquid paths 11a and 11b, and the cleaning liquid is made enter the merging flow paths 16a and 16b.

As a result, in conjunction with the compressed air, the cleaning liquid jets from the merging flow paths 16a and 16b in a form of a mist. Thus, the cleaning liquid in the form of a mist can be caused to jet from the discharge ports 10a and 10b serving as the distal ends of the merging flow paths 16a and 16b, and be sprayed over the lens surface 1a. This makes it possible to remove the foreign substance attached on the lens surface 1a with the synergistic effect of the cleaning liquid in the form of a mist and the air pressure.

Furthermore, after the cleaning liquid within the secondary tank 13 is jetted, and all the cleaning liquid is consumed at a time t2 shown in FIG. 7(b), only the compressed air is jetted during a period of time from t2 to t3, whereby water droplets attached on the lens surface 1a can be removed with this compressed air.

In other words, the pressurized cleaning mode is a mode in which the air pump 5 (compressed-air delivery section) is driven; the compressed air is caused to jet from the discharge ports 10a and 10b; the cleaning liquid supplied to the cleaning liquid paths 11a and 11b is suctioned with the negative pressure occurring as a result of the jet of the compressed air to jet the cleaning liquid from the discharge ports 10a and 10b; and the lens surface 1a is cleaned with the compressed air and cleaning liquid jetted. By driving the cleaning liquid pump 3 (cleaning-liquid delivery section) and continuously delivering the compressed air by the air pump 5 (compressed-air delivery section), the cleaning liquid and the compressed air are caused to continuously jet from the discharge ports 10a and 10b. With the jet of the compressed air, the cleaning liquid path is made into the negative pressure to make the cleaning liquid into the form of a mist and cause it to jet, whereby the lens surface can be effectively cleaned with the small amount of cleaning liquid. This pressurized cleaning mode is suitable for applications that remove foreign substances such as mud attached on the lens surface 1a.

Furthermore, by increasing the period of time for driving the cleaning liquid pump 3 shown in FIG. 7(a) (for example, setting the period of time from t0 to t1 to 400 msec), it is possible to push the cleaning liquid stored in the secondary tank 13 by the pressure of the cleaning liquid pump 3, and the cleaning liquid pressurized can be supplied to the cleaning liquid paths 11a and 11b, whereby it is possible to clean the lens surface 1a with a high pressure.

Figure 8:
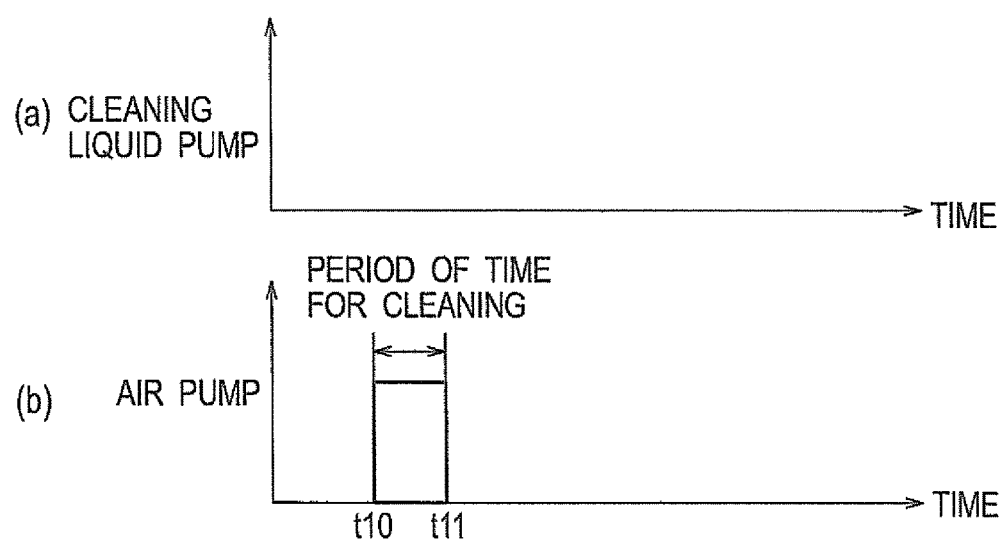

Next, the air blow mode will be described. In the air blow mode, only the air pump 5 is driven in a state where the cleaning liquid is not stored in the secondary tank 13. More specifically, the cleaning liquid pump 3 is stopped as illustrated in FIG. 8(a), and the air pump 5 is driven for a period of time from t10 to t11 (for example, two seconds) as illustrated in FIG. 8(b). Then, the compressed air passes through the distal end portions 14a and 14b of the air passage 12 and the merging flow paths 16a and 16b to jet from the discharge ports 10a and 10b, and is sprayed over the lens surface 1a. As a result, the water droplets attached on the lens surface 1a of the camera 1 can be removed by the air pressure.

At this time, the pipe 23 connected with the secondary tank 13 is placed in a substantially vertical direction as illustrated in FIG. 6(b). Furthermore, the bottom surface 13d of the secondary tank 13 is placed at a position higher than the discharge ports 10a and 10b, and the bottom surface 13d of the secondary tank 13 and the pipe for the cleaning liquid are sloped downward, whereby the cleaning liquid does not remain in the secondary tank 13 and its pipe. Thus, even in the case where the compressed air jets, and the inside of the secondary tank 13 becomes negative pressure, it is possible to prevent the cleaning liquid from being introduced into the merging flow paths 16a and 16b, and it is possible to prevent the cleaning liquid from mixing with the compressed air. This makes it possible to avoid occurrence of a problem in that the cleaning liquid mixed with the compressed air is attached on the lens surface 1a again at the time of jetting the compressed air to remove the water droplet attached on the lens surface 1a. In other words, the air blow mode is a mode in which the delivery of the cleaning liquid by the cleaning liquid pump 3 (cleaning-liquid delivery section) is stopped; the compressed air is delivered to the air pipe 6 by the air pump 5 (compressed-air delivery section) in a state where supply of the cleaning liquid is stopped; and the compressed air is caused to jet from the discharge ports 10a and 10b, whereby the lens surface 1a is cleaned. The air blow mode is suitable to remove the water droplets attached on the lens surface 1a.

Figure 9:
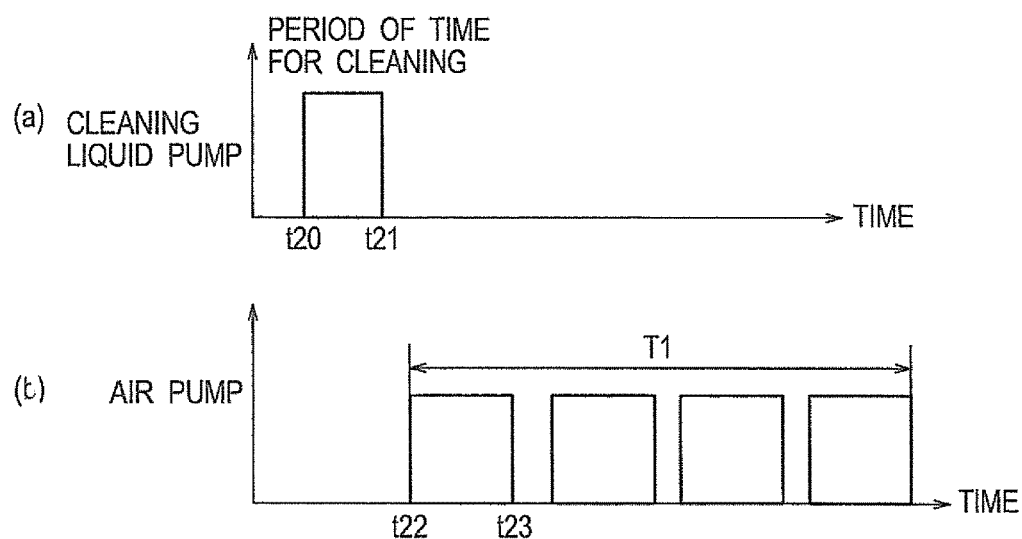

Next, the continuous water supply mode will be described. In the continuous water supply mode, the cleaning liquid is supplied from the cleaning liquid pump 3 into the secondary tank 13, and furthermore, the air pump 5 is intermittently driven, whereby the cleaning liquid is dropped on the lens surface 1a. More specifically, as illustrated in FIG. 9(a) and FIG. 9(b), the cleaning liquid is stored in the secondary tank 13 by driving the cleaning liquid pump 3 for a period of time from t20 to t21, and then, at a time t22, the air pump 5 is intermittently driven plural times within a period of time T1, whereby the small amount of the cleaning liquid is dropped on the lens surface 1a. For example, by setting the period of time from t22 to t23 to 30 msec, the small amount (for example, 0.25 cc) of the cleaning liquid is dropped on the lens surface 1a for each drop.

As a result, it is possible to always maintain the lens surface 1a in a wet state, and it is possible to prevent deposition of contaminants contained in the water droplet splashed by the vehicle itself during rainy weather. In other words, the continuous water supply mode is a mode in which the compressed air is caused to intermittently jet from the discharge ports 10a and 10b for plural times, and the cleaning liquid is suctioned with the negative pressure occurring due to the jet of the compressed air to cause the cleaning liquid to jet from the discharge ports 10a and 10b onto the lens surface 1a. This continuous water supply mode is suitable to maintain the lens surface 1a in the wet state at the time of rainy weather to prevent the contaminants from depositing on the lens surface 1a before it happens.

Each of the cleaning modes described above may be set by the driver of the vehicle through manual operations. Alternately, it may be possible to detect dirt states of the camera 1 or weather states, and automatically select a cleaning mode according to the result of detection, thereby doing cleaning.

Furthermore, in this embodiment, when cleaning with cleaning liquid is completed, the compressed air is caused to jet, and all of the cleaning liquid remaining in the secondary tank 13 is discharged to make the secondary tank 13 empty. At this time, if the cleaning liquid, which jets in conjunction with the compressed air, is attached on the surface of the lens surface 1a, this may have an effect on images captured by the camera 1. Thus, in order to reduce this effect, the compressed air is caused to jet for a predetermined period of time (for example, 30 seconds) to dry the lens surface 1a after all of the cleaning liquid remaining in the secondary tank 13 is fully discharged.

Furthermore, in the case where it is raining or things attached on the lens surface 1a are water droplets, even if conditions for modes (the continuous water supply mode, or the pressurized cleaning mode) using cleaning liquid are canceled, it is determined that there is a possibility that such a mode is performed again because splash or rain may become severe again. Thus, jet of the compressed air with the aim of discharging the remaining cleaning liquid is stopped for a while until a predetermined period of time elapses after the condition described above is canceled.

Furthermore, if the compressed air is caused to jet when a vehicle is parked, this may lead to a case where the cleaning liquid attaches in the vicinity of a trunk, or the discharge of the compressed air makes a passenger feel awkwardness at the time of opening the trunk. Thus, if the vehicle speed becomes slower than or equal to a certain speed (for example, 10 km/h), the jet of the compressed air is stopped. Furthermore, by taking such a case into consideration, the compressed air is caused to jet when the vehicle speed increases to a certain speed or faster (for example, 5 km/h or faster) after the ignition of the vehicle is turned on.

During this jet of the compressed air, performing the cleaning mode is stopped.

Furthermore, if the compressed air is caused to jet to discharge the cleaning liquid in a state where only the small amount of the cleaning liquid remains in the secondary tank 13, the cleaning liquid intermittently jets, and this may have an effect on capturing of images using the camera 1. Thus, it may be possible to jet the compressed air, for example, in the case where the vehicle speed reduces to be slower than or equal to a vehicle speed (for example, 30 km/h) at which an application using the images captured by the camera 1 is activated.

Furthermore, it may be possible to jet the compressed air for a predetermined period of time to dry the lens surface 1a if a predetermined distance is traveled or a predetermined period of time elapses in the case where conditions for cleaning the lens surface 1a are canceled.

As described above, in the cleaning device 100 for a vehicle-mounted camera according to this embodiment, the air passage 12 is provided to the distal end portion of the nozzle 7; the cleaning liquid paths 11a and 11b are provided in the vicinity of the air passage 12; and, the distal end portions 14a and 14b of the air passage 12 and the distal end portions 15a and 15b of the cleaning liquid paths 11a and 11b are merged with each other. Furthermore, the secondary tank 13 is provided upstream of the cleaning liquid paths 11a and 11b, and a certain amount of the cleaning liquid is stored in the secondary tank 13. Thus, it is possible to mix the compressed air with the cleaning liquid stored in the secondary tank 13 to jet the mixture onto the lens surface 1a of the camera 1, whereby it is possible to clean the lens surface 1a with a small amount of the cleaning liquid.

Furthermore, by supplying the compressed air to the air passage 12 to cause it to jet from the distal end portions 14a and 14b, the secondary tank 13 is made into the negative pressure to suction the cleaning liquid from the cleaning liquid paths 11a and 11b, and the cleaning liquid and the compressed air are mixed at the merging flow paths 16a and 16b to cause the mixture to jet from the discharge ports 10a and 10b. Thus, it is possible to make the cleaning liquid into the form of a mist, and further reduce the amount of the cleaning liquid required for cleaning.

Furthermore, the check valve 24 is provided to the secondary tank 13, and the outside air is introduced into the secondary tank 13 in the case where the inside of the secondary tank 13 becomes negative pressure, whereby it is possible to prevent the cleaning liquid from entering the secondary tank 13 through the cleaning liquid pipe 4 in the case where the inside of the secondary tank 13 becomes the negative pressure. For this reason, delivery of the cleaning liquid ends at the time when the entire cleaning liquid stored in the secondary tank 13 is consumed, and the delivery of the cleaning liquid is suspended until the cleaning liquid is newly supplied by the cleaning liquid pump 3, whereby it is possible to prevent the cleaning liquid from jetting in an unnecessary manner.

Furthermore, the pipe 23 (see FIGS. 6(a) and 6(b)) for supplying the cleaning liquid to the secondary tank 13 is placed in the vertical direction. In other words, a connecting portion of the cleaning liquid pipe connected with the secondary tank 13 is disposed in the vertical direction. Thus, in the case where supply of the cleaning liquid by the cleaning liquid pump 3 (see FIG. 1) is stopped, it is possible to prevent the cleaning liquid staying in the pathway from accidentally entering the secondary tank 13. Thus, for example, when the compressed air is caused to jet with the air blow mode, it is possible to prevent the cleaning liquid from mixing.

Furthermore, the bottom surface 13d of the secondary tank 13 is placed at a position higher than the discharge ports 10a and 10b, and the cleaning liquid paths 11a and 11b connecting the secondary tank 13 with the nozzle 7 are sloped so as to descend from the secondary tank 13 to the discharge ports 10a and 10b. Thus, the cleaning liquid stored in the secondary tank 13 and the cleaning liquid paths 11a and 11b is delivered to the discharge ports 10a and 10b without remaining there. Thus, it is possible to prevent the remaining cleaning liquid from irregularly discharging.

These are descriptions of the cleaning device for a vehicle-mounted camera according to the present invention based on the embodiment illustrated. However, the present invention is not limited to those described above, and it may be possible to replace the configuration of each unit with any given configuration that has a similar function.

For example, in the embodiment described above, descriptions have been made of an example in which one line of air passage 12 and two lines of cleaning liquid paths are provided in the nozzle 7, and these are merged to form two lines of merging flow paths 16a and 16b. However, the present invention is not limited to this, and it may be possible to employ a configuration in which one or more air passages and one or more cleaning liquid paths are merged at the distal end portion.

Furthermore, the embodiment described above employs the configuration in which the compressed air and the cleaning liquid are merged at the distal end portion of the nozzle 7. However, the present invention is not limited to this, and it is possible to employ a configuration in which the air passage and the cleaning liquid paths are disposed so as to be close to each other, and when the compressed air is discharged from the air passage, the cleaning liquid supplied from the cleaning liquid path is made into the form of a mist using the negative pressure at this time, thereby jetting it. In this case, the distal end portions 14a and 15a and the distal end portions 14b and 15b, each of which is illustrated in FIG. 4(b), are not merged, and jetting is performed in a state where they are proximate to each other.

The present invention can be used to effectively clean the lens surface of the camera mounted on the vehicle with a small amount of cleaning liquid. With the secondary tank being provided, the cleaning liquid necessary for cleaning is stored in the secondary tank in advance. Thus, it is possible to hold an appropriate amount of cleaning liquid in advance, and effectively clean the lens surface with a small amount of cleaning liquid without excessively discharging the cleaning liquid.

The invention claimed is:

1. A cleaning device for a vehicle-mounted camera, comprising:
 a camera having a lens surface;
 a nozzle having a discharge port disposed so as to face the lens surface, and configured to discharge a cleaning liquid and compressed air to the lens surface;
 a primary tank that stores the cleaning liquid;
 a secondary tank having a predetermined volume for storing the cleaning liquid, the predetermined volume being smaller than a volume of the primary tank, the secondary tank being positioned closer to the nozzle than the primary tank so as to be able to temporarily store the predetermined volume of the cleaning liquid;
 a cleaning-liquid delivery section that delivers the cleaning liquid stored in the primary tank to the secondary tank through a cleaning liquid pipe connected at one end to the cleaning-liquid delivery section and the other end with the secondary tank;

a cleaning liquid path having one end connected to the secondary tank and another end connected to the nozzle; and a compressed-air delivery section that delivers the compressed air to the nozzle through an air pipe having one end connected to the compressed-air delivery section and another end connected to the nozzle, wherein the other end of the air pipe is adjacent to the other end of the cleaning liquid path in the nozzle, wherein a part of the cleaning liquid pipe is a connecting portion arranged at the other end of the cleaning liquid pipe and extending in a vertical direction, wherein a direction of flow of the cleaning liquid in the connecting portion is oriented upward in the vertical direction by connecting an upper end of the connecting portion with the secondary tank, wherein the cleaning liquid pipe and the secondary tank are connected at a position higher than a bottom portion of the secondary tank, the bottom portion where the secondary tank and the cleaning liquid path are connected, and wherein the secondary tank is provided with a check valve that prevents outflow of air from the secondary tank to the outside and allows air to enter the secondary tank from the outside.

2. The cleaning device for a vehicle-mounted camera according to claim 1, wherein the secondary tank is disposed at a position higher than the discharge port of the nozzle, and the cleaning liquid path connecting the secondary tank and the nozzle is disposed so as to be sloped downward from the secondary tank to the nozzle.

\* \* \* \* \*